E. B. PERRIGO.
ANIMAL JAW PULLER.
APPLICATION FILED MAY 2, 1910.
962,782.
Patented June 28, 1910.
2 SHEETS—SHEET 1.
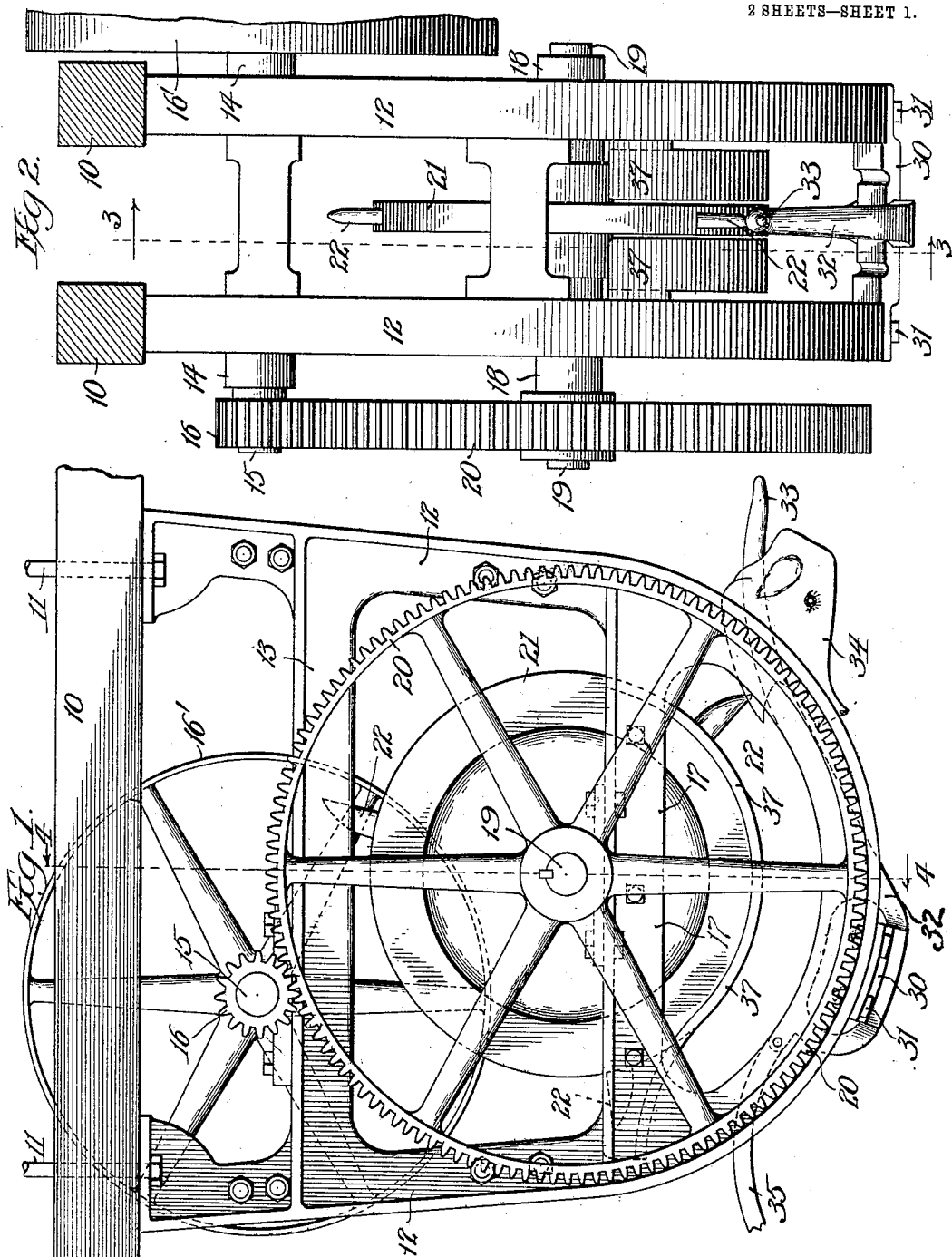
Witnesses:
Inventor:
Edwin B. Perrigo,
By Linthicum, Belt & Fuller
Attys.

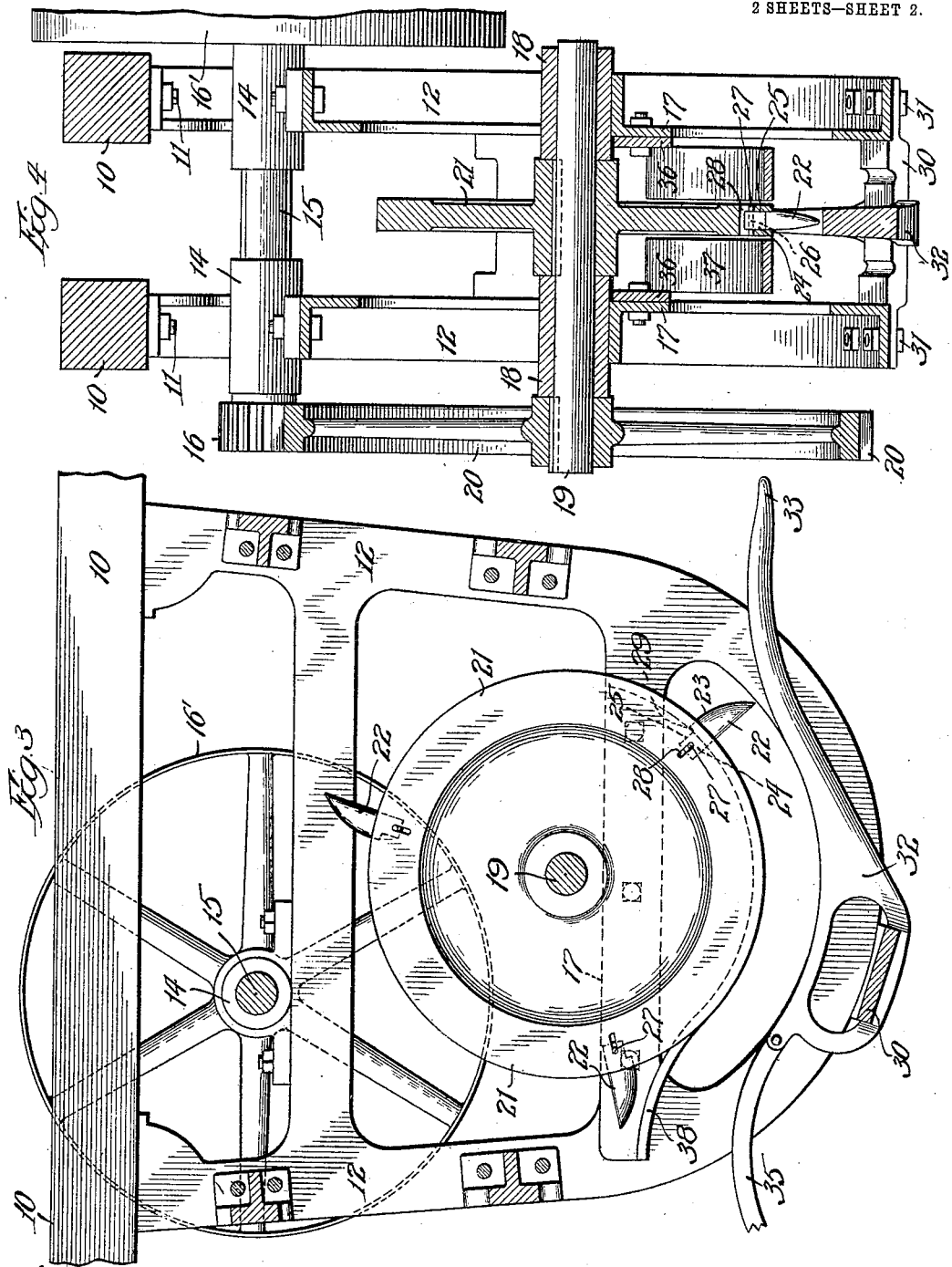

UNITED STATES PATENT OFFICE.

EDWIN B. PERRIGO, OF SIOUX CITY, IOWA, ASSIGNOR TO ARMOUR & COMPANY, OF CHICAGO, ILLINOIS, A CORPORATION OF ILLINOIS.

ANIMAL-JAW PULLER.

962,782.    Specification of Letters Patent.    Patented June 28, 1910.

Application filed May 2, 1910. Serial No. 558,834.

*To all whom it may concern:*

Be it known that I, EDWIN B. PERRIGO, a citizen of the United States, residing at Sioux City, in the county of Woodbury and State of Iowa, have invented certain new and useful Improvements in Animal-Jaw Pullers, of which the following is a specification.

My invention relates to animal jaw pullers, and has special reference to a device which is adapted to automatically separate the jaws from the heads of animals as these heads are fed to the device.

After the heads have been cut from the animals in packing houses, it is necessary to remove the jaws from these heads in order that subsequent operations may be performed on the heads. Heretofore this separation of the jaws has been attended with considerable labor, and consequent high cost. According to the provisions of my invention, the heads which have been separated from the bodies are placed on a wedge shaped pin, this pin passing through the mouth and out through the esophagus. A rotatable disk, on the periphery of which are mounted pins, is operated from a suitable source of power, and these pins on coming in contact with the head, force the same along the wedge shaped pin, and the jaw is thereby separated from the head. On account of the action of gravity on the head itself, when the head is placed on the wedge shaped receiving pin, the jaw is brought into a position above the pin, whereas the head occupies a position below the same. It will thus be evident that when the separation of the jaw from the head takes place, the head will fall downwardly onto a suitable conveyer whereas the jaw will be carried onward by the action of the rotating disk, from the pins of which it is removed by a suitable guide, this jaw then falling onto a separate conveyer. In this way, separation of the jaws from the heads is entirely automatic, and the same are then collected in appropriate receivers. These and other advantages of my invention will be more apparent by reference to the accompanying drawings in which:

Figure 1 is a side elevation of my animal jaw puller. Fig. 2 is an end elevation of the parts shown in Fig. 1. Fig. 3 is a section on the line 3—3 of Fig. 2. Fig. 4 is a section on the line 4—4 of Fig. 1.

Securely attached to the beams 10, 10 by means of the bolts 11, 11, are the two side members 12, 12 of the main frame of the device. Each of the side members 12, 12 has a cross arm 13, on which are mounted the bearings 14, 14 through which the shaft 15 passes. On one end of the shaft 15 is rigidly mounted a pulley 16' while on the other end is mounted a pinion 16. Each of the side members 12, 12 is also provided with a second cross arm 17, on which are mounted the bearings 18, 18 in which the shaft 19 rotates. Keyed to one end of the shaft 19 is the gear 20, which is in mesh with the pinion 16. Keyed to the central portion of the shaft 19, between the bearings 18, 18, is the disk 21, on the periphery of which are mounted the pins 22, 22, 22. It is thus apparent that when the pulley 16' is rotated by means of a suitable belt connected with the source of power, the gear 20 will likewise be rotated by means of the pinion 16, and this motion will be transferred through shaft 19 to the disk 21.

As most clearly shown in Figs. 3 and 4, each of the pins 22 consists of a portion 23 which lies outside of the periphery of the disk 21 and a portion 24 which is inserted within a suitable hole 25 in the periphery of the said disk. The portion 24 of the pin 22 has a transverse hole 26 which is engaged by a pin 27 driven into position on the side of the disk 21, this pin entering through the slot 28 cut from one side to the other of the disk. It will be apparent that the pin 27 coöperating with the shoulder 29, between the portions 23 and 24 of the pin 22, will serve to hold the pin 22 securely in position. When it is desired to remove pin 22, pin 27 is first driven out of the hole 26 in the pin 22, and a wedge is then inserted in the slot 28. On exerting suitable pressure on this wedge, it will be evident that the pin 22 will be forced outwardly.

Connecting the two sides of the lower portions of the side members 12, 12, is the cross member 30 securely held in position by the bolts 31, 31. Bolted to the cross member 30 is a wedge shaped receiving pin 32, on the pointed end 33 of which the head 34 is adapted to be placed. The wedge shaped pin 32 passes through the mouth and out through the esophagus of this head. Attached to the wedge shaped receiving pin 32, is the guide 35, the object of which will be explained hereafter.

Bolted to the cross arms 17, 17 of the side members 12, through the flanges 36, 36, are two upper guides 37, 37 which are clearly shown in Figs. 1 and 3. The guides 37, 37 follow on their lower surfaces the curve of the disk 21 until they reach the reverse curved portions 38.

The operation of my improved jaw puller may now be readily understood. The head 34 is placed on the receiving pin 32 in such a position that as the disk 21 rotates, a pin 22 will engage the jaw, and the head will then be moved to the left as indicated in Fig. 1. On account of the shape of the pin 32, the head will be separated from the jaw by wedging action, and this head will then fall into a suitable conveyer, or receptacle. The jaw which is carried along the upper surface of the receiving pin 32 by the pin 22, will continue to be carried to the left until it reaches the reverse curved portions 38 of the upper guides 37. These guides will then remove the jaw from the pin 22 and the jaw will fall onto the lower guide 35 connected to the receiving pin 32, and will then fall onto a suitable conveyer or into a suitable receptacle. If for any reason the jaw, after being removed from pin 22, is not carried sufficiently far to the left to pass to the conveyer just mentioned, the jaws which are separated from the heads which are subsequently placed on the receiving pin 32 will force the jaw just mentioned to the left until it passes to the conveyer.

It will be clear from the description which I have just given that by means of my improved device, a rapid and automatic separation of jaws from heads takes place, and that these are automatically carried onto suitable conveyers or into suitable receptacles.

Many changes can be made in the detailed construction of the parts which I have described without departing from the spirit of my invention.

I claim:

1. In a device of the class described, the combination of a wedge member adapted to receive a head with its attached jaw, and means for moving said head along said wedge member, thereby separating the jaw from the head, substantially as described.

2. In a device of the class described, the combination of a wedge member adapted to receive a head with its attached jaw, and rotatable means for moving said head along said wedge member, thereby separating the jaw from the head, substantially as described.

3. In a device of the class described, the combination of a wedge shaped pin for receiving a head with its attached jaw, a rotatable disk, and means mounted on said disk for moving said head along said pin, thereby separating the jaw from said head, substantially as described.

4. In a device of the class described, the combination of a wedge shaped receiving pin on which a head with its attached jaw is adapted to be placed, a rotatable disk, and a pin mounted on said disk, said pin adapted to engage said head and move the same along the receiving pin, thereby separating the jaw from the head, substantially as described.

5. In a device of the class described, the combination of a wedge member adapted to receive a head with its attached jaw, means for forcing said head along said wedge member, and guiding means for removing said jaw from said forcing means, substantially as described.

6. In a device of the class described, the combination of a wedge member adapted to receive a head with its attached jaw, rotatable means for forcing said head along said wedge member, thereby separating said jaw from said head, and guide means for removing the jaw from said rotatable means, substantially as described.

7. In a device of the class described, the combination of a wedge shaped receiving pin on which a head with its attached jaw is adapted to be mounted, a rotatable disk, a plurality of pins mounted on said disk, one of said pins adapted to force said head along said wedge shaped member, thereby separating the jaw from the head, and guide means for removing the jaw from said pin, substantially as described.

8. In a device of the class described, the combination of a wedge shaped receiving pin on which a head with its attached jaw is adapted to be mounted, a rotatable disk, means for rotating said disk, a pin mounted on the periphery of said disk, said pin adapted to engage said head and force it along said receiving pin when said disk is rotated, thereby separating said jaw from said head, a guide associated with said receiving pin, and a second guide adapted to remove said jaw from the pin on said rotatable disk, substantially as described.

9. In a device of the class described, the combination of a wedge shaped receiving pin on which a head with its associated jaw is adapted to be mounted, rotatable means for moving said head along said receiving pin, thereby separating said jaw from said head, and a pair of guides adapted to separate said jaw from said rotatable means, substantially as described.

10. In a device of the class described, the combination of a wedge shaped receiving pin adapted to receive a head with its attached jaw, a rotatable disk, means for rotating said disk, a plurality of pins mounted on the periphery of said disk, one of said pins adapted to move said head along said receiving pin, thereby separating said jaw from said head, and a pair of guides on the sides of said disk, said guides having a reverse curve and thereby adapted to separate said jaw from the pin on said disk when the disk is rotated, substantially as described.

EDWIN B. PERRIGO.

Witnesses:
 J. V. NEWBERRY,
 H. E. ROSE.